(12) United States Patent
Kimura (10) Patent No.: US 6,572,465 B2
(45) Date of Patent: Jun. 3, 2003

(54) METHOD OF AND APPARATUS FOR PROCESSING ENDS OF A CHAIN OF NATURAL INTESTINE SAUSAGES

(75) Inventor: Nobuo Kimura, Yokohama (JP)

(73) Assignee: Hitec Co., Ltd., Kanagawa (JP)

( * ) Notice: Subject to any disclaimer, the term of this patent is extended or adjusted under 35 U.S.C. 154(b) by 0 days.

(21) Appl. No.: 09/876,172

(22) Filed: Jun. 8, 2001

(65) Prior Publication Data

US 2002/0049034 A1 Apr. 25, 2002

(30) Foreign Application Priority Data

Jun. 13, 2000  (JP) ....................................... 2000-177336

(51) Int. Cl.[7] ............................................... A22C 11/00
(52) U.S. Cl. ............................... 452/51; 452/30; 452/46
(58) Field of Search ............................. 452/97, 46, 30, 452/34, 27, 51, 31

(56) References Cited

U.S. PATENT DOCUMENTS

| | | | | |
|---|---|---|---|---|
| 3,964,129 A | * | 6/1976 | Townsend | 452/51 |
| 4,532,858 A | * | 8/1985 | Hershfeld | 452/51 |
| 5,064,401 A | * | 11/1991 | Kasai et al. | 452/46 |
| 5,073,142 A | * | 12/1991 | Kasai et al. | 452/51 |
| 5,163,864 A | * | 11/1992 | Burger et al. | 452/51 |
| 5,197,915 A | * | 3/1993 | Nakamura et al. | 452/51 |
| 6,083,093 A | * | 7/2000 | Williams | 452/51 |
| 6,213,368 B1 | * | 4/2001 | Vermeer et al. | 452/51 |
| 6,283,846 B1 | * | 9/2001 | Townsend | 452/27 |

FOREIGN PATENT DOCUMENTS

| | | |
|---|---|---|
| JP | 63-177189 | 11/1988 |
| JP | 4-126032 | 4/1992 |

\* cited by examiner

*Primary Examiner*—William A Cuchlinski, Jr.
*Assistant Examiner*—Joan M. Olszewski
(74) *Attorney, Agent, or Firm*—Nixon & Vanderhye (57) ABSTRACT

An apparatus for processing ends of a chain of natural intestine sausages which is used together with a suspending device for suspending and transporting a chain of natural intestine sausages includes: a heating device having a liquid tank in which a heating liquid is stored and which is disposed at a position below suspending members of the suspending device, so as to thermally contract a leading end portion and a trailing end portion of the chain of sausages on a continuous basis.

14 Claims, 8 Drawing Sheets

METHOD OF AND APPARATUS FOR PROCESSING ENDS OF A CHAIN OF NATURAL INTESTINE SAUSAGES

BACKGROUND OF THE INVENTION

1. Field of the Invention

The present invention relates to a method of and an apparatus for processing ends of a chain of natural intestine sausages, which are used in the technical field of manufacturing sausages.

2. Description of the Related Art

A chain of linked sausages made up of a stuffed casing is manufactured by filling a sausage material into one casing and by forming the stuffed casing into a multiplicity of links. End processing for preventing the sausage material from leaking from its both ends is effected with respect to a leading end portion and a trailing end portion of the manufactured chain of the stuffed casing. For example, this end processing is conventionally carried out by using an apparatus disclosed in JP-B-63-177189U or JP-A-4-126032 before or after the chain of the stuffed casing is manually taken up onto a smoking stick. With such known end processing methods, prior to effecting end processing it is necessary to manually move either one or both of the chain of the linked stuffed casing and the end processing apparatus to a position where they are aligned. In addition, to effect end processing, it has been necessary for an operator to insert an end portion of the chain of natural intestine sausages into a sealing gap portion of the end processing apparatus while holding the end processing apparatus with one hand and holding the end portion of the intestine casing with the other hand. Thus, the method of end processing using a conventional apparatus involved much manual operation by the operator, so that the operating efficiency has been low.

SUMMARY OF THE INVENTION

The present invention has been devised in view of the above-described circumstances, and a first object of the invention is to provide a method of and an apparatus for processing ends of a chain of natural intestine sausages, which allow the apparatus to be used by being connected to an apparatus which continuously effects the manufacture of sausages and formation of sausage loops. A second object of the invention is to provide a method of and an apparatus for processing ends of a chain of natural intestine sausages, which do not require or practically do not require man power and are high in operating efficiency.

In accordance with a first aspect of the invention, there is provided a method of processing ends of a chain of natural intestine sausages, comprising the steps of: suspending a chain of natural intestine sausages by suspending means; immersing a leading end portion of the chain of natural intestine sausages in heating means: removing the leading end portion immersed in the heating means from the heating means: immersing a trailing end portion of the chain of natural intestine sausages in the heating means: and removing the tailing end portion immersed in the heating means from the heating means In accordance with a second aspect of the invention, there is provided an apparatus for processing ends of a chain of natural intestine sausages which is used together with suspending means for suspending and transporting a chain of natural intestine sausages, comprising: heating means having a liquid tank in which a heating liquid is stored and which is disposed at a position below suspending members of the suspending means.

In accordance with a third aspect of the invention, in the apparatus for processing ends of a chain of natural intestine sausages according to the second aspect of the invention, the liquid tank has a length sufficient for causing a natural intestine casing to be immersed in the heating liquid during the time required for thermally contracting said natural intestine casing.

In accordance with a fourth aspect of the invention, in the apparatus for processing ends of a chain of natural intestine sausages according to the second aspect of the invention, the heating means has a heater for heating the heating liquid.

In accordance with a fifth aspect of the invention, in the apparatus for processing ends of a chain of natural intestine sausages according to the fourth aspect of the invention, the heater Is disposed inside the liquid tank.

In accordance with the invention, it is possible to provide a method of and an apparatus for processing ends of a chain of natural intestine sausages, which make it possible to continuously effect the end processing of the chain of sausages following the manufacture of sausages and formation of sausage loops. Further, in accordance with the invention, it is possible to provide a method of and an apparatus for processing ends of a chain of natural intestine sausages, which do not require or practically do not require man power and are high in operating efficiency.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a detailed description will be given of the preferred embodiments of the invention. It should be noted that the invention is not limited to these embodiments.

In FIGS. 1 to 4, an apparatus 1 for processing ends of a chain of natural intestine sausages is an apparatus which is used in conjunction with a sausage manufacturing apparatus 3 which transports a chain of natural intestine sausages 2 toward a suspending means 4 as well as the suspending means 4 including a multiplicity of suspending members 5 for suspending the chain of natural intestine sausages 2 carried out from the sausage manufacturing apparatus 3 and an endless connector 6 for circulatingly moving the suspending members 5. The apparatus 1 for processing ends of a chain of natural intestine sausages is comprised of a heating means 7 having a liquid tank 9 in which a heating liquid 8 is stored and which is disposed at a position below the suspending members 5.

Figure 1:
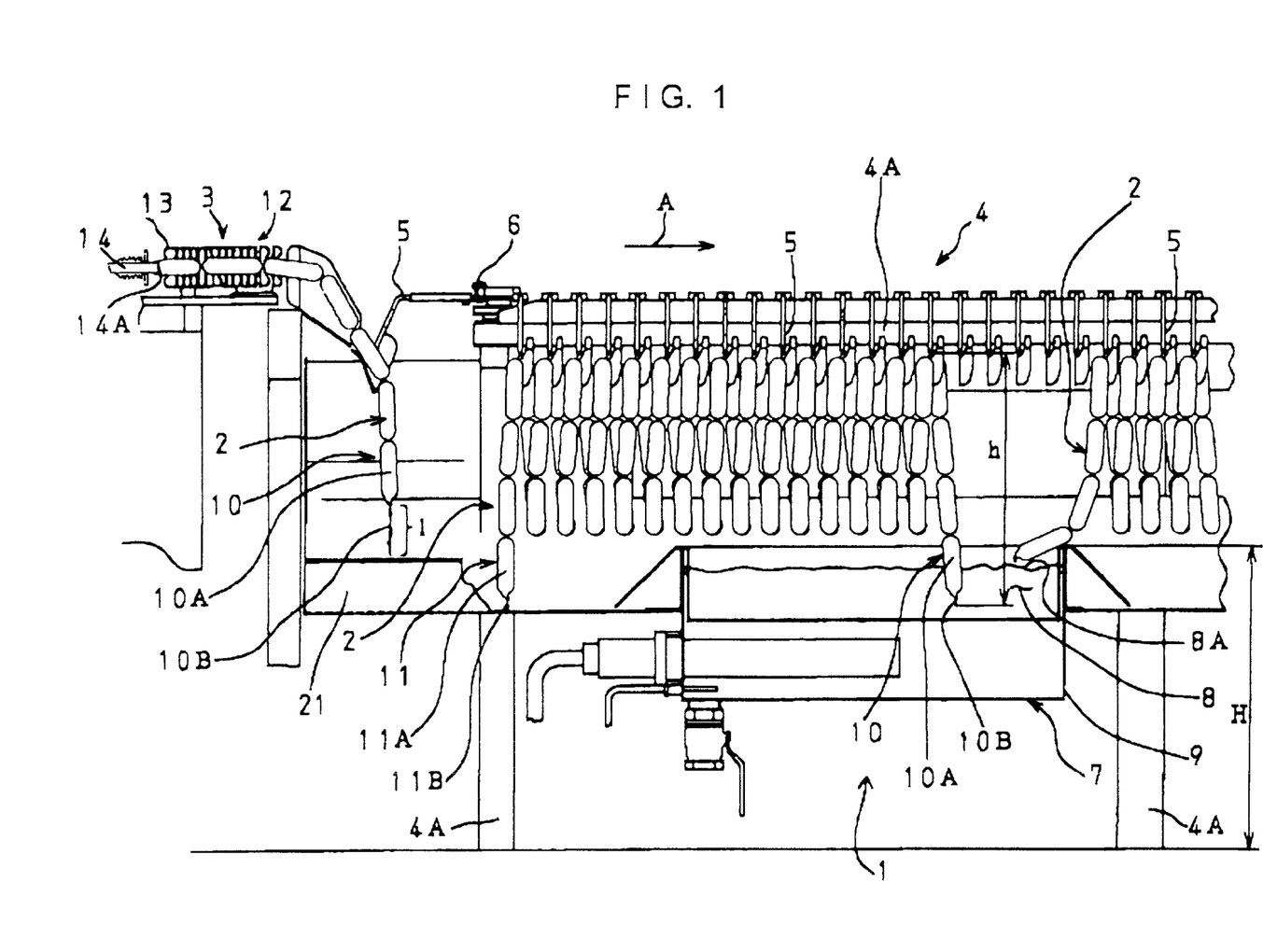
FIG. 1 is an explanatory front elevational view of a preferred embodiment of the invention.
Figure 2:
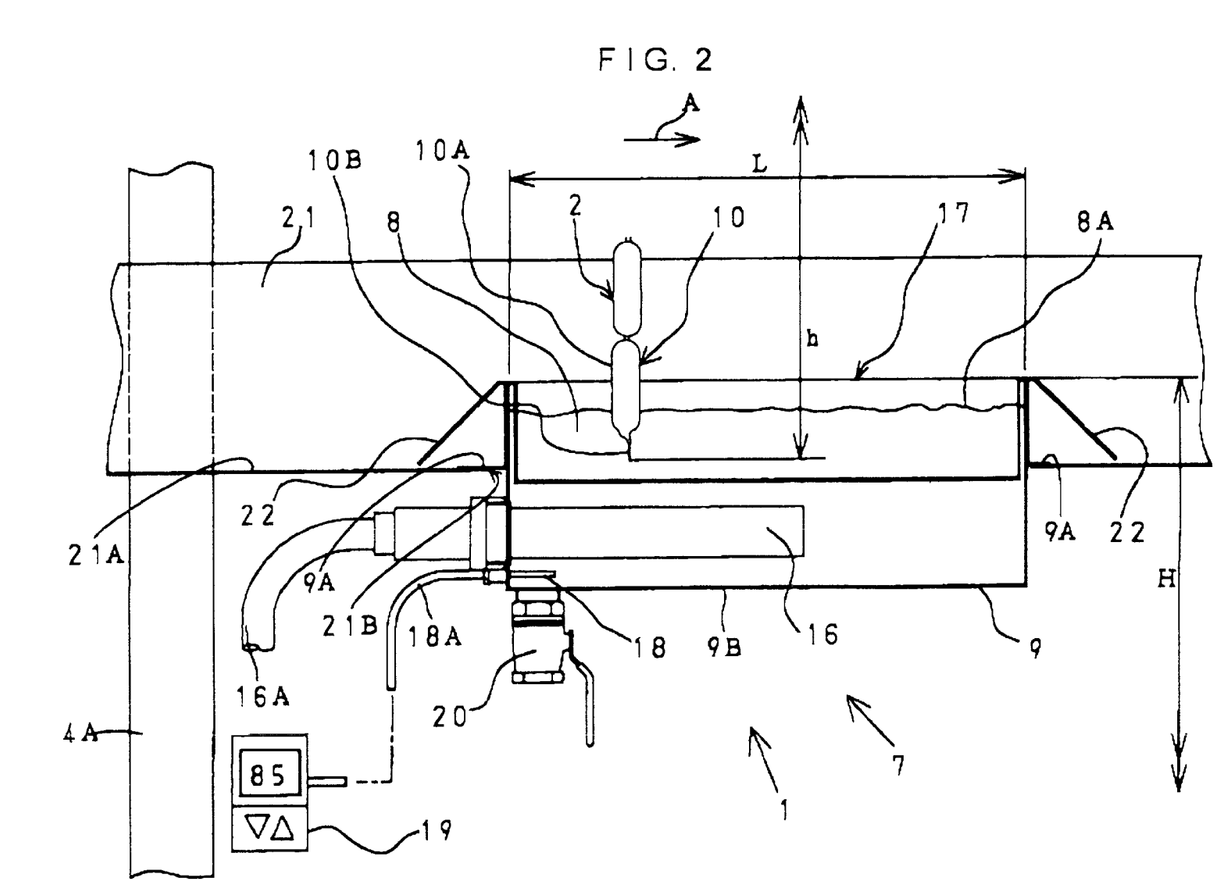
FIG. 2 is an explanatory front elevational partially enlarged view of FIG. 1.

A leading end portion 10 of the chain of natural intestine sausages 2 includes a portion 10A where a sausage material is filled in a natural intestine casing as well as a portion 10B where the sausage material is not filled in the natural intestine casing. Meanwhile, a trailing end portion 11 of the chain of natural intestine sausages 2 includes a portion 11A where the sausage material is filled in the natural intestine casing as well as a portion 11B where the sausage material is not filled in the natural intestine casing.

The sausage manufacturing apparatus 3 is comprised of a transporting means 12 having a pair of wrapping connectors 13. e.g., a pair of chains or belts, which travel at a fixed speed while pinching the natural intestine sausage 2 from its outer sides. It should be noted that the sausage manufacturing apparatus 3 may be of a type which is not provided with the transporting means 12. In that case, the suspending means 4 is disposed so that the suspending members 5 pass a position lower than and adjacent to a distal end 14A of a stuffing nozzle 14 of the sausage manufacturing apparatus 3. The chain of natural intestine sausages 2 is allowed to drop from the distal end 14A toward the suspending member 5 due to the stuffing pressure with which the natural intestine casing is stuffed with the sausage material by the sausage manufacturing apparatus 3.

The multiplicity of suspending members 5 are attached to the endless connector 6 at predetermined intervals, the endless connector 6 being formed by an endless chain or belt which circulatingly moves at a predetermined speed in a horizontal plane in synchronism with the transporting means 12. The suspending members 5 consecutively catch the chain of natural intestine sausages 2 which is carried out from the transporting means 12, and suspends it therefrom.

As shown in FIG. 2, the heating means 7 includes, in addition to the liquid tank 9, a heater 16 projecting into the liquid tank 9; a porous shielding member 17 provided at a position above the heater 16: a sensor 18 for measuring the temperature of the heating liquid 8; a temperature regulator 19 for effecting on-off control of the energization of the heater 16 on the basis of a measured value of the sensor 18; and a valve 20 for draining the heating liquid 8 out of the liquid tank 9 to replace with new heating liquid 8. Since the heater 16 is an electric heater, the heater 16 is suitable for maintaining the heating liquid 8 at a desired temperature. Since the heater 16 is provided inside the liquid tank 9, the thermal efficiency of heating the heating liquid B is high.

Figure 3:
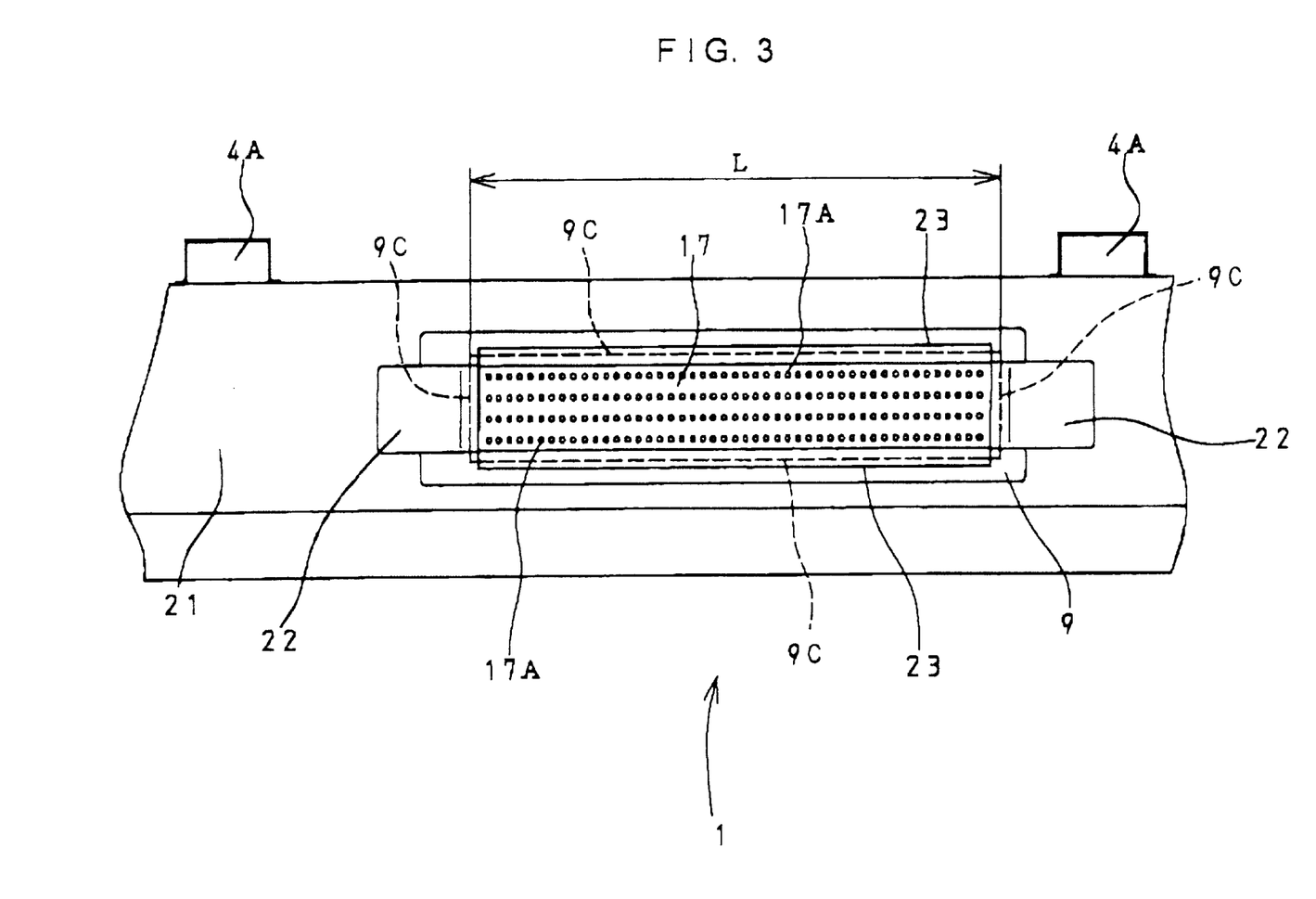
FIG. 3 is an explanatory plan view of FIG. 2.
Figure 4:
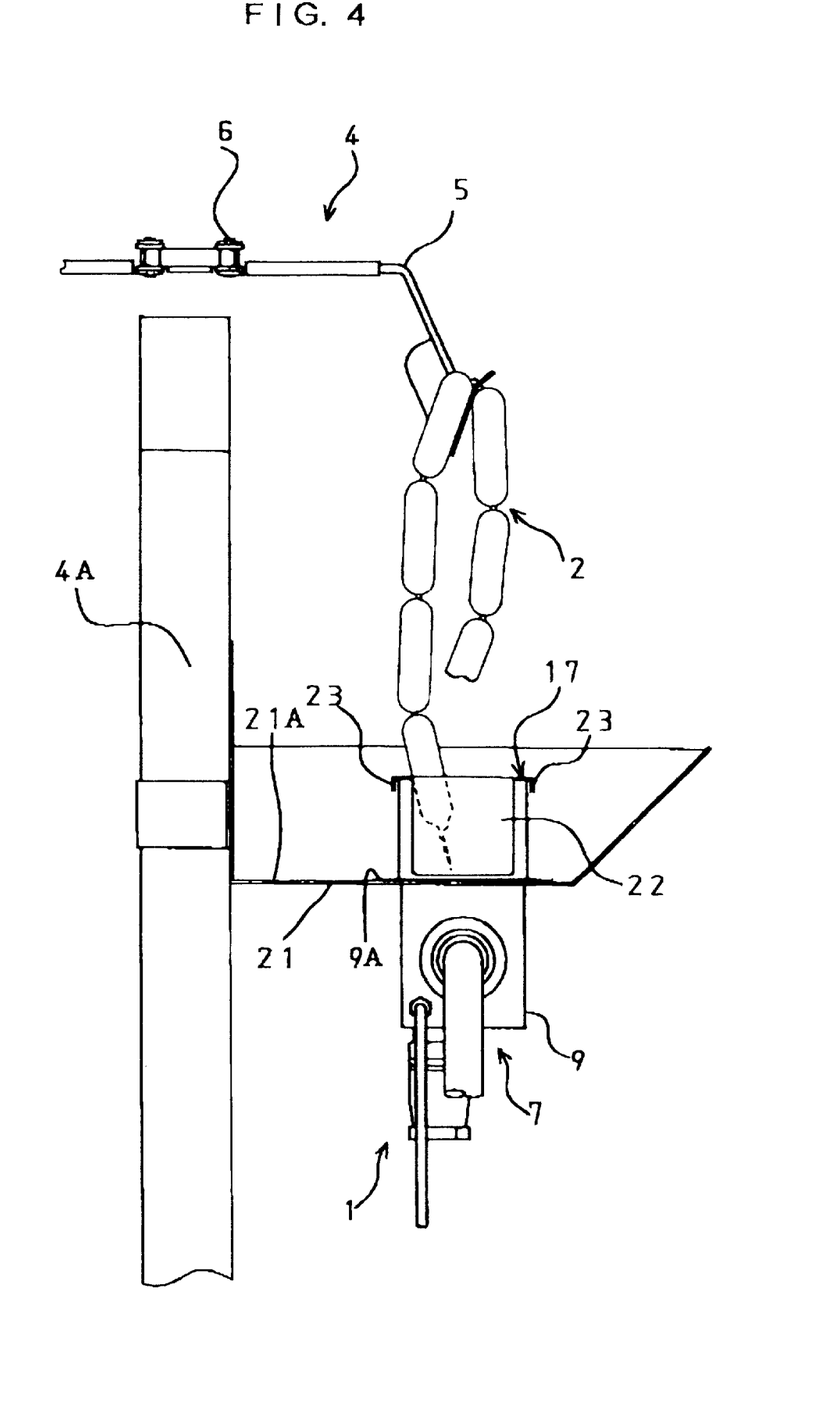
FIG. 4 is an explanatory left side elevational view of FIG. 1.

The liquid tank 9 is provided in a pan 21 which is disposed at a position below the suspending members 5 and has a shape elongated in the direction of arrow A. The liquid tank 9 is a rectangular parallelepiped whose upper surface is open, and edge portions 9A are formed on its outer peripheral side surfaces The pan 21 is attached to frames 4A of the suspending means 4 in such a manner as to be adjustable in the heightwise direction, and has a substantially U-shaped cross section (see FIG. 4) so as to receive the sausage material and water attached to the chain of sausages 2 suspended from the suspending members 5. The edge portions 9A of the liquid tank 9 are placed on a bottom surface 21A of the pan 21, and the bottom 9B of the liquid tank 9 is passed through a hole portion 21B provided in the pan 21. Since wiring accessories 16A of the heater 16 and wiring accessories 18A of the sensor 18 are fixedly provided on that portion of a side surface of the liquid tank 9 which is passed through and located below the pan 21, the sausage material is difficult to be attached to them. The porous shielding member 17 is designed to prevent the sausage material attached to the surfaces of the sausages 2 from settling on the heater 16. The porous shielding member 17 is made up of a thin plate which has collar portions 22 and 23 for being retained by upper edges 9C of the liquid tank 9, is detachably fitted to the liquid tank 9, and has a multiplicity of holes 17A of the size for preventing the passage of the sausage material. The collar portions 22 also serve as guides at the time when the leading end portion 10 and the trailing end portion 11 suspended from the suspending members 5 move into and out of the liquid tank 9.

The liquid tank 9 has a length L sufficient for causing the portions 10B an 11B, where the sausage material is not filled in the natural intestine casing and which are being transported by the suspending members 5, to be immersed in the heating liquid 8 during the time required for thermally contracting those portions 10B and 11B. The installation height H of the liquid tank 9 is such a height that the liquid level 8A of the heating liquid 8 is located above those portions 10B and 11B. Since the portions 10A and 11A where the sausage material is filled in the natural intestine casing need not to be immersed in the heating liquid 8, the liquid tank 9 is set to the height H of such a measure that those portions 10A and 11A are partially immersed. The height of the liquid tank 9 is also adjusted in accordance with the suspended length h of the end portion from the suspending member 5. It should be noted that the height of the liquid level 8A is also adjustable by increasing or decreasing the amount of the heating liquid 8.

The heating liquid 8 is water which is kept at a desired temperature, e.g. 85° C. or thereabouts, by the temperature regulator 19, and heats the aforementioned portions 10B and 11B immersed in the heating liquid 8 to contract the natural intestine casing at the portions 10B and 11B, thereby closing the end portions 10 and 11 of the chain of natural intestine sausages 2.

The heating means 7 may involve a device for jetting heated stean into the liquid 8, instead of using the electric heater 16 For instance, a steam jetting device may be utilized which comprises a long and narrow pipe disposed inside the liquid tank 9 along the longitudinal direction of the liquid tank 9. And on the outer peripheral surface of said pipe, are formed a plurality of steam jetting holes in the predetermined arrangement.

Figure 5A:
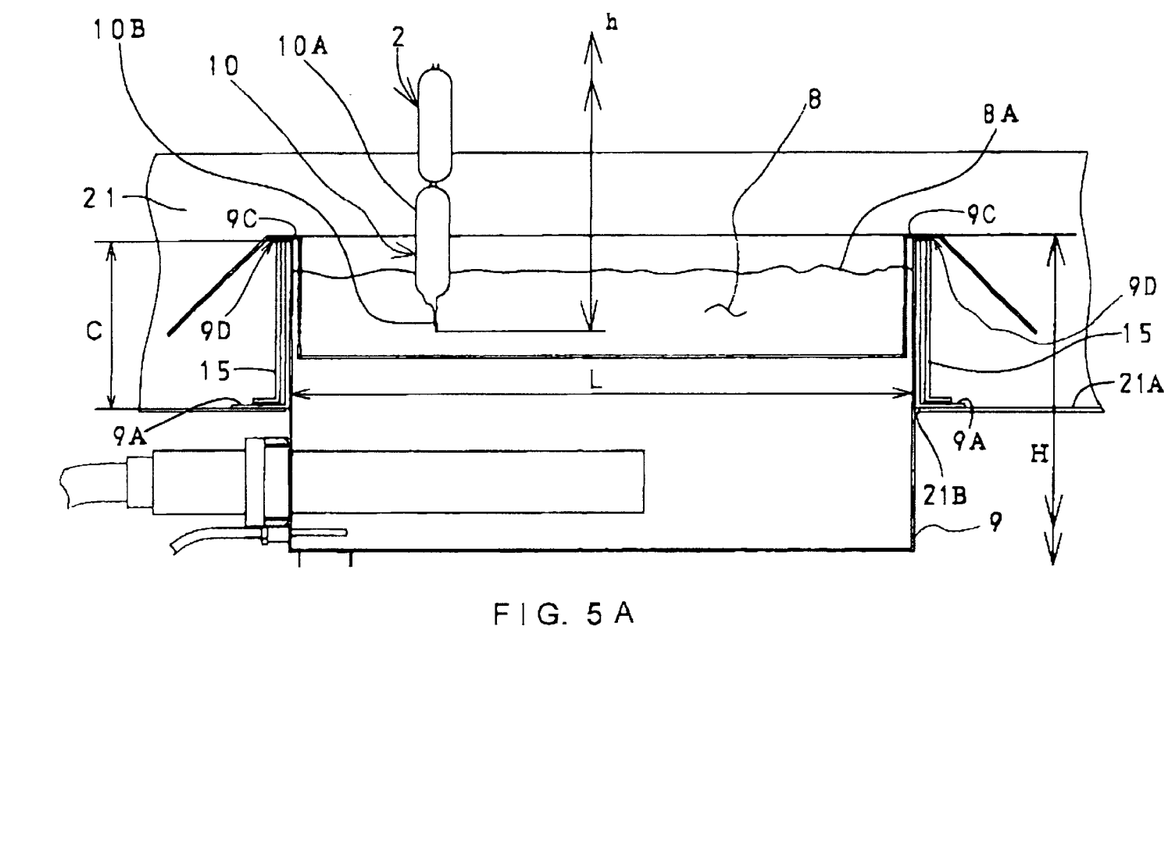
FIG. 5A is an explanatory front elevational view of another preferred embodiment of the invention.
Figure 5B:
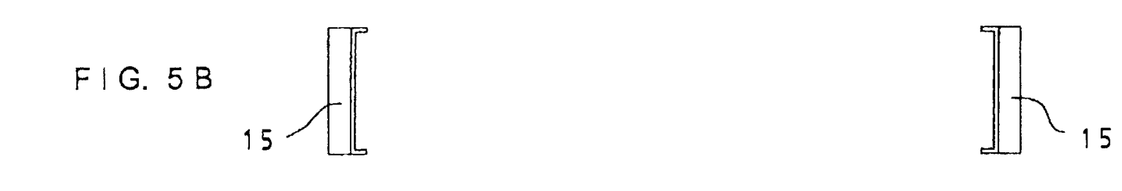
FIG. 5B is a plan view of only a height adjusting means shown in FIG. 5A.

To set the height H of the liquid tank 9 shown in FIG. 1 higher, the liquid tank 9 may be provided with a height adjusting means 15 such as the one shown in FIGS. 5A and 58. The height adjusting means 15 consists of two parts each having a U-shaped cross section (see FIG. 5B). and these two parts are opposed to each other in such a manner as to clamp the liquid tank 9 from both sides, and are placed on the bottom surface 21A of the pan 21. The height adjusting means 15 defines the height H of the liquid tank 9 by supporting edge portions 9D of the liquid tank 9 by upper portions thereof. If a plurality of height adjusting means 15 having different heights C are selectively used, as required, the liquid tank 9 can be set to a desired height Instead of the aforementioned height adjusting means 15 consisting of two parts with U-shaped cross sections, the height adjusting means 15 may be screw members which are passed through the bottom surface 21A of the pan 21 and are threadedly engaged with the pan 21. By rotating the screw members supporting the edge portions 9D of the liquid tank 9 by upper portions thereof, the height of the liquid tank 9 can be adjusted in a stepless manner.

The apparatus 1 for processing ends of a chain of natural intestine sausages is adapted to operate as follows. The sausage manufacturing apparatus 3 is operated, and the leading end portion 10 of the chain of natural intestine sausages 2 is transported toward the suspending means 4 by the transporting means 12, the suspending members 5 of the suspending means 4 catches the chain of natural intestine sausages 2 and suspends the leading end portion 10 therefrom. The operation of the suspending members 5 is controlled such that the suspended length h of the end portion from the suspending member 5 to the tip of the leading end portion 10 is set to a desired length The suspended leading end portion 10, after being transported toward the liquid tank 9 by the moving suspending member 5, reaches the liquid tank 9.

The leading end portion 10 suspended from the suspending member 5 is transported in the direction of arrow A inside the liquid tank 9 in a state of being immersed in the heating liquid 8 in the liquid tank 9. During its transportation, the portion 10B where the sausage material is not filled in the natural intestine casing undergoes thermal contraction on heating, and its length 1 is reduced For example, the length 1 of the portion 10B changes from 80 mm prior to thermal contraction to 10 mm after thermal contraction owing to thermal contraction. As for the natural intestine casing of the portion 10B in an openable state prior to thermal contraction, its mouth is closed due to thermal contraction. The leading end portion 10 which passed through the interior of the liquid tank 9 by the movement of the suspending member 5 is removed from the heating liquid 8 as the suspending member 5 moves in the direction of arrow A.

The trailing end portion 11 of the chain of natural intestine sausages 2 transported by the transporting means 12 is transported toward the liquid tank 9 by the suspending member 5 in a state of being suspended from the suspending member 5, and then passes through the interior of the liquid tank 9. In this manner, the trailing end portion 11 is also immersed in the heating liquid 8, is subjected to heating and thermal contraction, and is removed from the heating liquid 8 in the same way as the above-described leading end portion 10.

When the passage of the chain of natural intestine sausages 2 through the interior of the liquid tank 9 is finished, the closing processing of both end portions 10 and 11 of the chain of natural intestine sausages 2 is completed. The sausage material does not leak from the leading end portion 10 and the trailing end portion 11 which have been closed. The chain of natural intestine sausages 2 is delivered from the suspending members 5 to a smoking stick for heat treatment, and is transported to a heat processing apparatus in a state in which it is suspended from the stick. Since the length 1 of the portions 10B and 11B of the natural intestine casing where the sausage material is not filled is short, it is possible to prevent unevenness of heat processing which can occur as the portions 10B and 11B stick to the sausages 2 during heat treatment.

Figure 6:
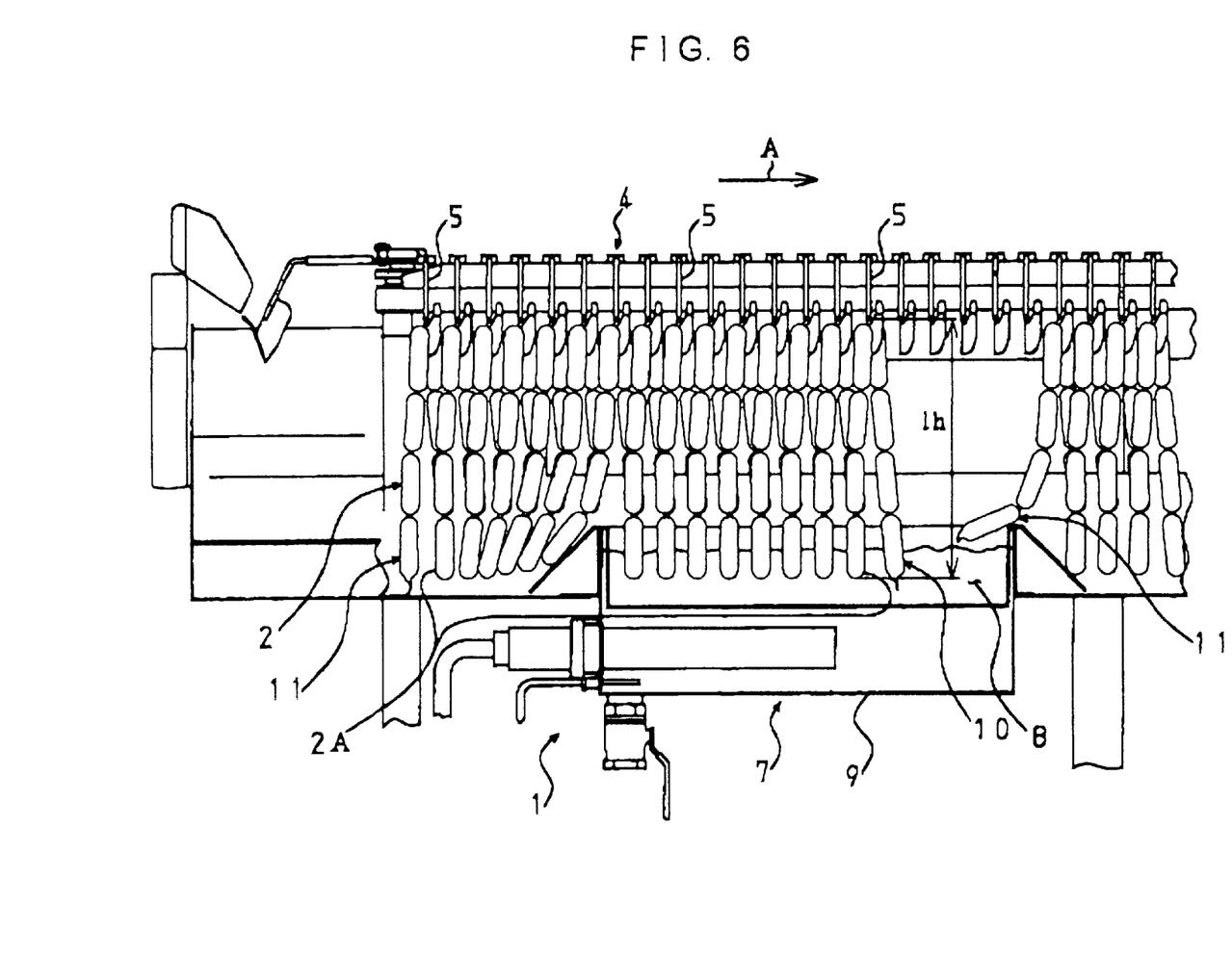
FIG. 6 is an explanatory front elevational view of still another preferred embodiment of the invention.

Although, in the above-described example, only the leading end portion 10 and the trailing end portion 11 are immersed in the heating liquid 8, an arrangement may be provided such that, as shown in FIG. 6, for example, the suspended length 1h of the loops is elongated, so that not only the leading end portion 10 and the trailing end portion 11 but also lower portions 2A of all the sausage loops suspended from the suspending members 5 which move in the direction of arrow A are immersed in the heating liquid 8 during the passage in the liquid tank 9.

Figure 7:
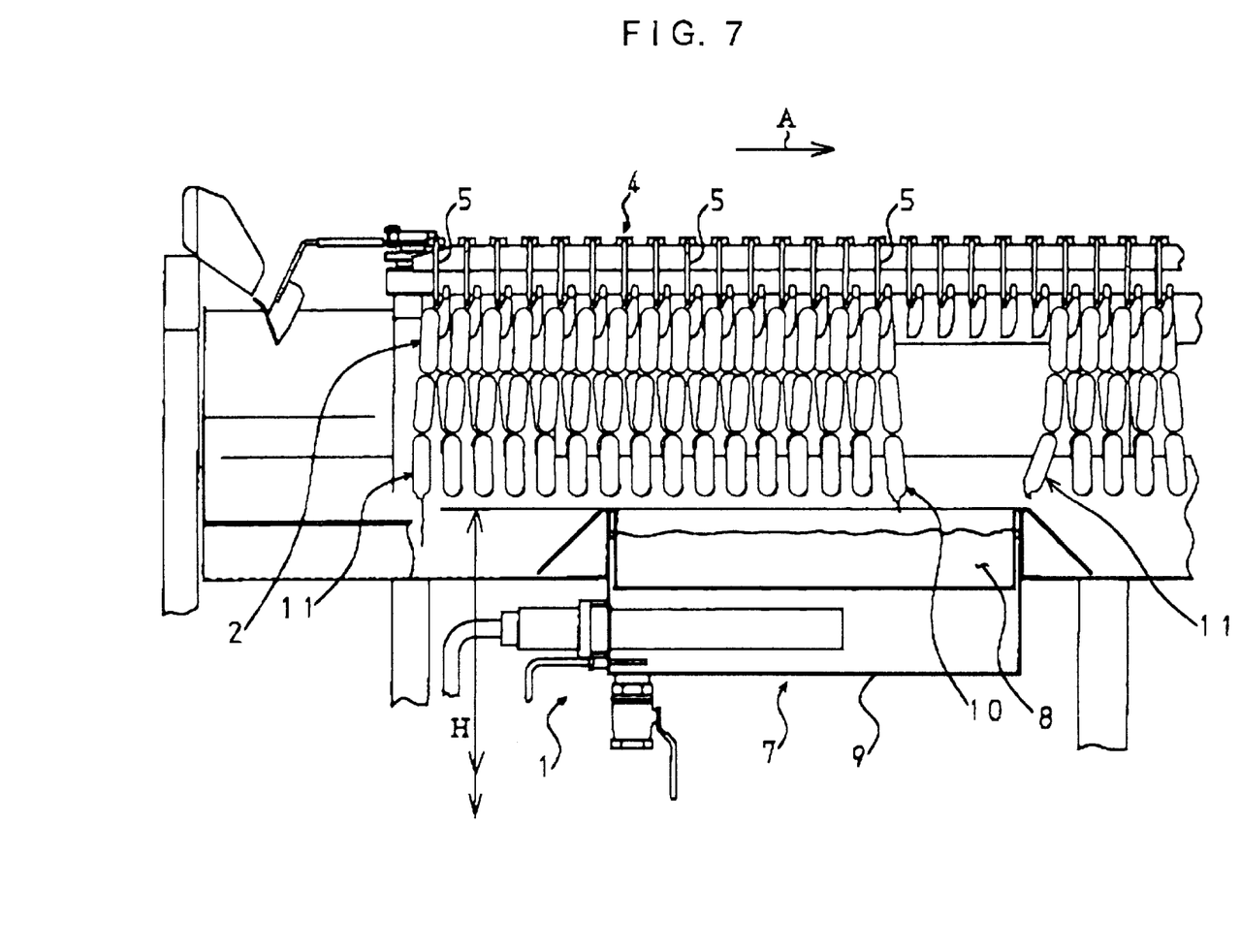
FIG. 7 is an explanatory front elevational view of a further preferred embodiment of the invention.

Still alternatively, an arrangement may be provided such that, contrary to the above-described two examples, as shown in FIG. 7, the height H of the liquid tank 9 is adjusted, and all the natural intestine sausages 2 suspended from the suspending members 5 are, without being immersed in the heating liquid 8, transported by the suspending members 5 moving in the direction of arrow A, and pass over the liquid tank 9. In the case of this method, each time each of the leading end portion 10 and the trailing end portion 11 passes over the liquid tank 9, each of the end portions 10 and 11 is manually removed from the suspending member 5 and is immersed in the heating liquid 8 for, for example, 3 seconds, is then manually taken out of the heating liquid 8 and is manually suspended from the suspending member 5. This example is suitable for the manufacture of natural intestine sausages 2 of the type for which heating is to be avoided.

Figure 8:
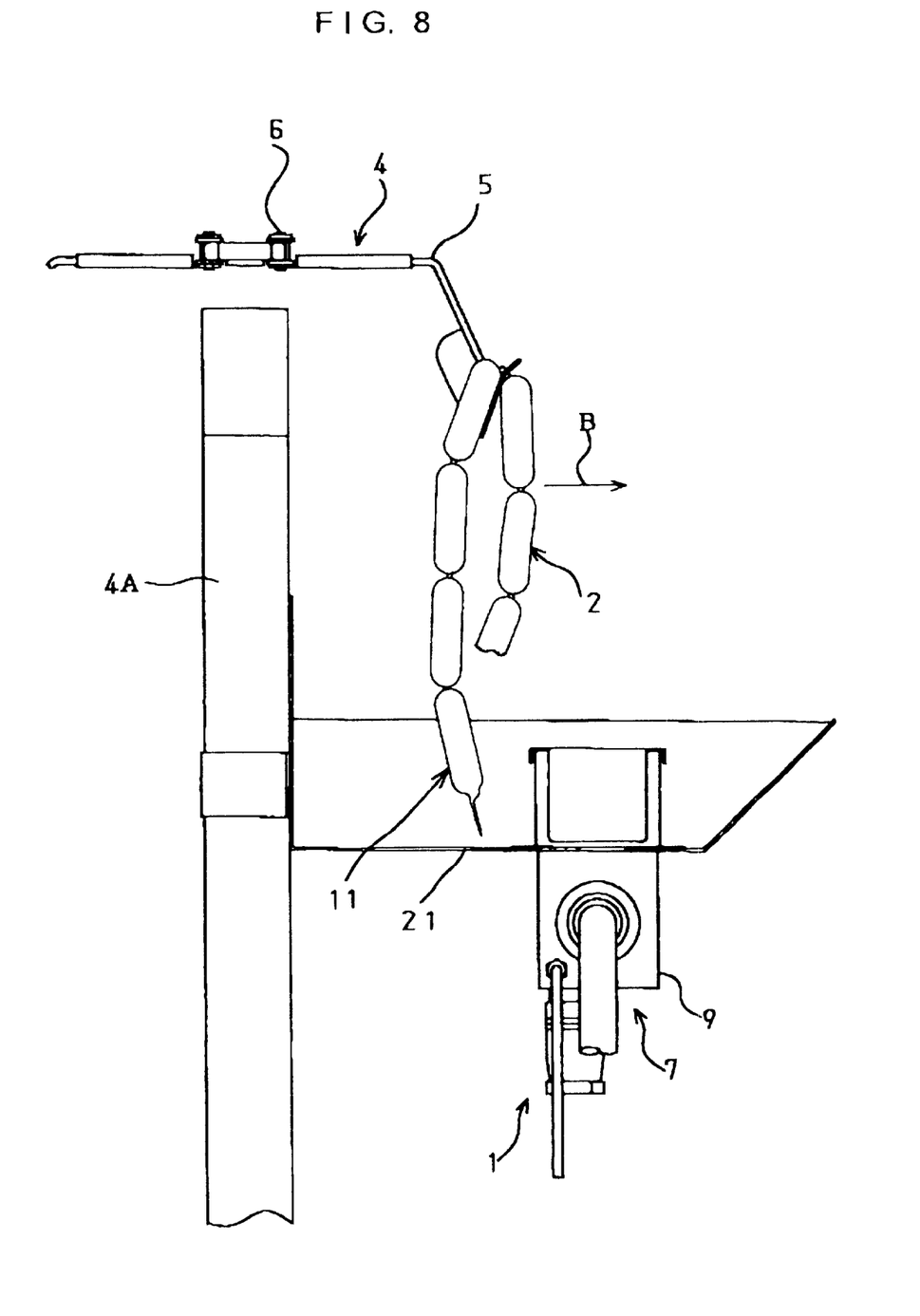
FIG. 8 is an explanatory left side elevational view of a still further preferred embodiment of the invention.

As shown in FIG. 8, the liquid tank 9 may be disposed at a position distanced in the horizontal direction relative to the suspending members 5 (in the direction of arrow B in this example). In this example as well, since the liquid tank 9 is located at a position below the suspending members 5, the leading end portion 10 and the trailing end portion 11 of the chain of natural intestine sausages 2 can be manually removed from the suspending members 5 and can be immersed in the heating liquid 8. In this example, since the natural intestine sausages 2 suspended from the suspending members 5 do not pass the area of the opening (see FIG. 3) of the liquid tank 9 which is defined by the upper edges 9C, it is possible to reduce the amount of sausage material attached to the natural intestine sausages 2 which is mixed into the heating liquid

What is claimed is:

1. A method of processing an end of a chain of natural intestine sausages comprising the steps of:

suspending a chain of natural intestine sausages by suspending means;

moving suspending members of said suspending means above and outside heating liquid;

immersing a leading end portion of the suspended chain of natural intestine sausages in the heating liquid and thereby thermally contracting the leading end portion;

removing the leading end portion immersed and contracted in said heating liquid from said heating liquid;

passing an upper portion of the suspended chain of natural intestine sausages through a space above and outside the heating liquid, said upper portion being between said leading end portion and a trailing end portion of the suspended chain of natural intestine sausages;

immersing said trailing end portion in said heating liquid and thereby thermally contracting the trailing end portion;

removing the trailing end portion immersed and contracted in said heating liquid from said heating liquid; and transporting the chain of natural intestine sausages, whose leading and trailing end portions have been removed from said heating liquid, to a heat processing apparatus in order to cook said chain of natural intestine sausages.

2. An apparatus for processing an end of a chain of natural intestine sausages which is used together with suspending means having suspending members for suspending and transporting a chain of natural intestine sausages, comprising:

heating means for heating an end portion of the chain of natural intestine sausages suspended and transported by said suspending members and thereby thermally contracting the end portion, said heating means having a liquid tank disposed below said suspending members, and a heating liquid, which is stored in said liquid tank, and in which said end portion is immersed and thereby is thermally contracted, said suspending members being transported to said liquid tank and passing above and outside the heating liquid.

3. The apparatus for processing an end of a chain of natural intestine sausages according to claim 2, wherein the liquid tank has an opening extending along the moving direction of the suspending members, said opening being disposed so as to be faced to the suspending members.

4. The apparatus for processing an end of a chain of natural intestine sausages according to claim 2, wherein said liquid tank has a length sufficient for causing the end portion to be immersed in the heating liquid during the time required for thermally contracting said end portion.

5. The apparatus for processing an end of a chain of natural intestine sausages according to claim 2, wherein said heating means has a heater for heating the heating liquid.

6. The apparatus for processing an end of a chain of natural intestine sausages according to claim 5, wherein said heater is disposed inside said liquid tank.

7. The apparatus for processing an end of a chain of natural intestine sausages according to claim 2, wherein the liquid tank is provided on a pan which is disposed below the suspending members, said pan extending along the moving direction of the suspending members.

8. A method of processing ends of a chain of natural intestine sausages having a leading end portion and a trailing end portion separated and spaced from one another by an intermediate portion of the chain of natural sausages, comprising the steps of:

suspending the chain of natural intestine sausages by a suspending means suspending the leading, trailing and intermediate portions of the chain of natural intestine sausages;

moving suspending members of said suspending means above and outside a bath of a heating liquid;

immersing the leading end portion of the suspended chain of natural intestine sausages in the heating liquid and thereby thermally contracting the leading end portion;

removing the leading end portion immersed and contracted in said heating liquid from said heating liquid;

passing the intermediate portion of the suspended chain of natural intestine sausages through a space above and outside the bath of heating liquid to preclude immersion thereof in said bath of heating liquid;

immersing said trailing end portion of the suspended chain of natural intestine sausages in said bath of heating liquid and thereby thermally contracting the trailing end portion;

removing the trailing end portion immersed and contracted in said heating liquid from said bath of heating liquid; and transporting the chain of natural intestine sausages, whose leading and trailing end portions have been removed from said heating liquid and thermally contracted, to a heat processing apparatus to cook said chain of natural intestine sausages.

9. An apparatus for processing an end of a chain of natural intestine sausages using suspending means having suspending members for suspending and transporting the chain of natural intestine sausages, comprising:

heating means for heating an end portion of the chain of natural intestine sausages suspended and transported by said suspending members and thereby thermally contracting the end portion, said heating means having a liquid tank disposed below said suspending members containing a heating liquid, and in which liquid said end portion is immersed and thereby is thermally contracted, said suspending members being transported to said liquid tank and passing above and outside the heating liquid.

10. The processing apparatus according to claim 9, wherein the liquid tank has an opening extending along the moving direction of the suspending members, said opening lying in vertical opposition to and in registration with the suspending members.

11. The processing apparatus according to claim 9, wherein said liquid tank has a length sufficient for causing the end portion to be immersed in the heating liquid during the time required for thermally contracting said end portion.

12. The processing apparatus according to claim 9, wherein said heating means includes a heater for heating the heating liquid.

13. The processing apparatus according to claim 12, wherein said heater is disposed inside said liquid tank.

14. The processing apparatus according to claim 9, wherein the liquid tank is provided on a pan disposed below the suspending members, said pan extending along the moving direction of the suspending members.

* * * * *

UNITED STATES PATENT AND TRADEMARK OFFICE
CERTIFICATE OF CORRECTION

PATENT NO.    : 6,572,465 B2
DATED         : June 3, 2003
INVENTOR(S)   : Kimura It is certified that error appears in the above-identified patent and that said Letters Patent is hereby corrected as shown below:

Column 8,
Line 27, insert -- heating -- after "which".

Signed and Sealed this

Second Day of December, 2003

JAMES E. ROGAN
*Director of the United States Patent and Trademark Office*